(12) United States Patent
Jenkins et al.

(10) Patent No.: US 8,923,463 B1
(45) Date of Patent: Dec. 30, 2014

(54) OFFSET CALIBRATION AND ADAPTIVE CHANNEL DATA SAMPLE POSITIONING

(71) Applicant: Xilinx, Inc., San Jose, CA (US)

(72) Inventors: Michael O. Jenkins, San Jose, CA (US); Cheng-Hsiang Hsieh, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 14/013,283

(22) Filed: Aug. 29, 2013

(51) Int. Cl.
*H04L 7/02* (2006.01)
*H04L 25/02* (2006.01)

(52) U.S. Cl.
CPC ..................................... *H04L 25/02* (2013.01)
USPC .......................................................... 375/355

(58) Field of Classification Search
CPC ..... H04L 7/0037; H04L 7/0033; H04L 7/027; H04L 7/0337
USPC .......................................................... 375/355
See application file for complete search history.

(56) References Cited

U.S. PATENT DOCUMENTS

| 2006/0034394 A1 | 2/2006 | Popescu et al. |
| 2006/0190756 A1 | 8/2006 | Okamura |
| 2010/0046683 A1* | 2/2010 | Beukema et al. ............. 375/355 |
| 2012/0269305 A1 | 10/2012 | Hogeboom |

OTHER PUBLICATIONS

Specification and drawings from U.S. Appl. No. 13/100,053, filed May 3, 2011, Asuncion et al.
Agilent, *Saving Time with Multiple-Channel Signal Integrity Measurements*, Application Note 1382-8, Mar. 14, 2002, pp. 1-12, Agilent Technologies, Inc., Santa Clara, California, USA.
Jenkins, Mike et al., "Acquisition & Analysis of High-Speed Serial Statistical Eyes at the Sampling Point in a Receiver," *Proc. of DesignCon*, Jan. 28, 2013, pp. 1-10, www.designcon.com.
Xilinx, *7 Series FPGAs GTX/GTH Transceivers User Guide*, UG476 (v1.9.1), Apr. 22, 2013, pp. 1-496, Xilinx, Inc., San Jose, California, USA. See particularly pp. 206-210.

* cited by examiner

*Primary Examiner* — Kevin Kim
(74) *Attorney, Agent, or Firm* — W. Eric Webostad

(57) ABSTRACT

In an apparatus, a receiver includes a clock data recovery module to provide a dense distribution of waveform edges across an adjustment range, and an eye scan circuit to obtain samples at a first sample position and a second sample position to provide an error count for a sample count for the samples. An eye scan module, coupled to the receiver, is configured to: scan for the samples at the first sample position of a first type for each of a plurality of sample positions of a second type to obtain an error count for a sample count for each of the plurality of sample positions; locate a threshold BER from the scan; determine an amount and a direction of a sample offset at the threshold BER from a reference location; and adjust either the first sample position or the second sample position responsive to the amount and the direction.

18 Claims, 11 Drawing Sheets

OFFSET CALIBRATION AND ADAPTIVE CHANNEL DATA SAMPLE POSITIONING

TECHNICAL FIELD

The following description relates to integrated circuit devices ("ICs"). More particularly, the following description relates to offset calibration and adaptive channel data sample positioning for an IC coupled to a communication channel.

BACKGROUND

A conventional clock-data recovery ("CDR") module of multi-gigabit serial data transceiver may align a clock to a median position of edges of a waveform after equalization. Data may be sampled a fixed time after this median position is aligned to a clock, such as at one-half of a bit period. However, this sample point may be less than optimal due to one or more of: (a) variations in the clock distributions between edge samplers and a data sampler may move a data sample point relative to an equalized waveform unpredictably; and (b) characteristics of a communication channel or an equalization skew of edge distributions may change unpredictably, inducing low probability bit errors on a long tail of such skewed distributions.

Hence, it is desirable and useful to provide sampling that increases margin for recovering data.

SUMMARY

A method relates generally to sample offset adjustment. In such a method, waveform edges associated with an asynchronous input are provided to a receiver. The waveform edges are densely distributed across an adjustment range. At least a portion of the adjustment range is scanned for samples from the dense distribution of waveform edges at a first sample position of a first type for each of a plurality of sample positions of a second type different from the first type to obtain an error count for a sample count for each of the plurality of sample positions across at least the portion of the adjustment range. The first sample position is fixed, and a second sample position from the plurality of sample positions is moved across at least the portion of the adjustment range. The scanning includes performing a plurality of sampling cycles for the sample count at each of the plurality of sample positions. A threshold bit error rate ("BER") is located from the scanning. An amount and a direction of a sample offset at the threshold BER from a reference location is determined. Either the first sample position or the second sample position is adjusted responsive to the amount and the direction of the sample offset to at least reduce the sample offset.

Another method relates generally to data sample position adjustment. In such a method, recovered data is obtained from a receiver for a synchronous input provided to the receiver. Eye edges are tracked for a selected bit error rate for the recovered data to determine a right edge position value and a left edge position value associated with a communications lane. An average value is determined as between the right edge position value and the left edge position value. A data sample position is moved responsive to the average value.

An apparatus relates generally to sample offset adjustment. A receiver includes a clock data recovery module to provide a dense distribution of waveform edges for an asynchronous input to the receiver. The waveform edges are densely distributed across an adjustment range. The receiver includes an eye scan circuit to obtain samples from the dense distribution of waveform edges at a first sample position and a second sample position and to provide an error count for a sample count for the samples. An eye scan module is coupled to the receiver and is configured to scan at least a portion of the adjustment range for the samples at the first sample position of a first type for each of a plurality of sample positions of a second type different from the first type to obtain an error count for a sample count for each of the plurality of sample positions. The first sample position is fixed. The eye scan circuit is coupled to the eye scan module to increment the second sample position from the plurality of sample positions for movement across at least the portion of the adjustment range. The eye scan circuit is coupled to the eye scan module to take a plurality of samples for the sample count at each of the plurality of sample positions. The eye scan module is further configured to: locate a threshold bit error rate (BER) from the scan; determine an amount and a direction of a sample offset at the threshold BER from a reference location; and adjust either the first sample position or the second sample position responsive to the amount and the direction of the sample offset to at least reduce the sample offset.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

Figure 1:
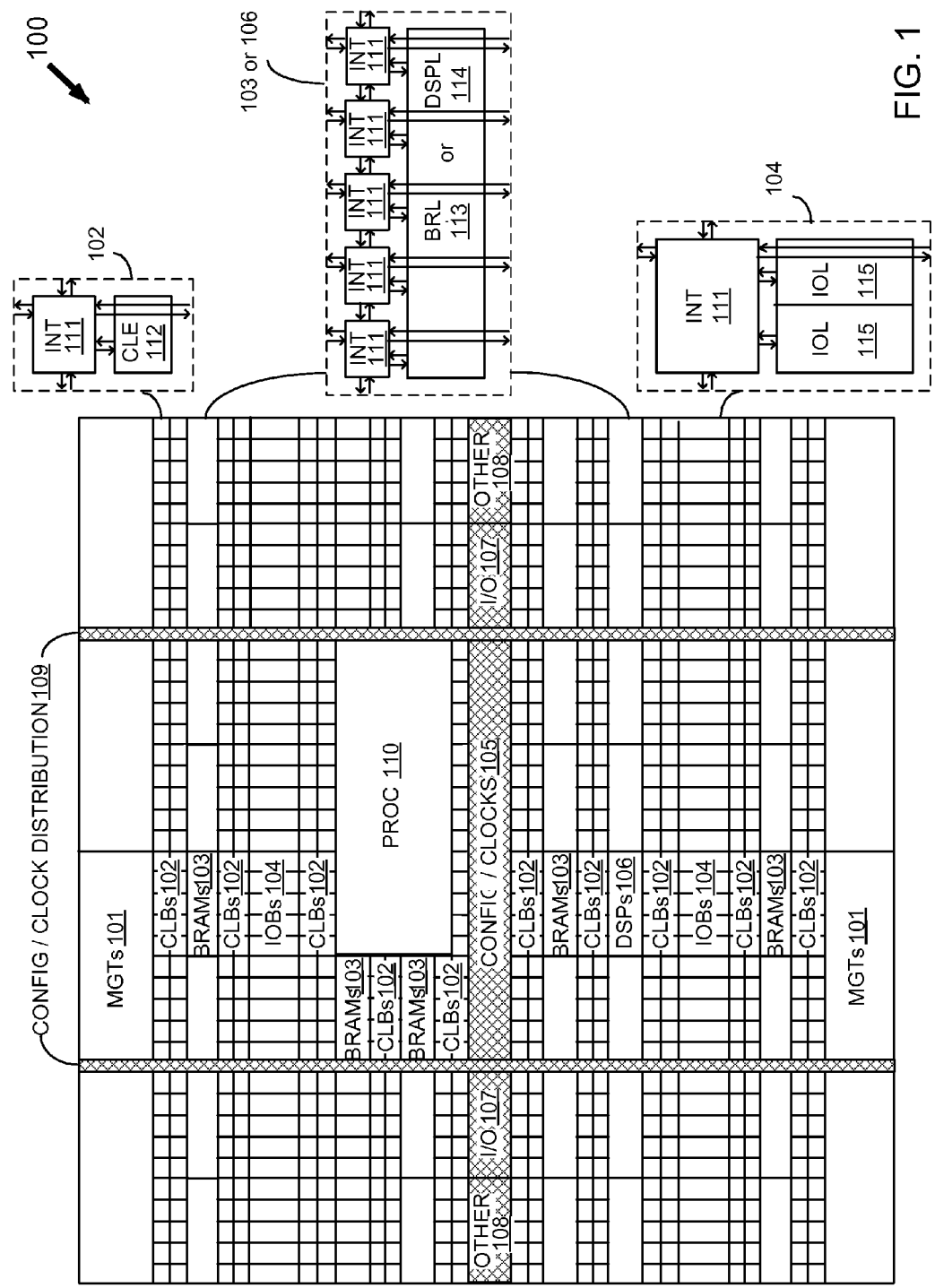
FIG. 1 is a simplified block diagram depicting an exemplary columnar Field Programmable Gate Array ("FPGA") architecture.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding. Generally, jitter or noise associated with data provided via a communications channel or lane may affect margin for recovery of such data within a data eye. Eye scan may be used to determine relative position of data to such a data eye. However, to account for a horizontal or vertical offset between an eye scan sample position and a data sample position, an offset adjustment or adjustments may be made. As described below in additional detail, an offset calibration flow may be used to at least reduce such offset to reduce an error rate. Furthermore, data drift, even after offset calibration, may cause a data eye to not be positioned to enhance margin for data recovery. As described below in additional detail, a channel adaptive data sample positioning flow may be used to enhance such margin. Having a well-controlled interval between a median edge position of a data eye and a data sample therein may be provided by having low-probability tails of data eye edge distributions determined adaptively to adjust data sample position optimally or at least to increase margin in such data eye.

With the above general understanding borne in mind, various configurations for an offset calibration flow and a channel adaptive data sample positioning flow are generally described below.

Because one or more of the above-described examples are described herein using a particular type of IC, a detailed description of such an IC is provided below. However, it should be understood that other types of ICs may benefit from one or more of the techniques described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay-locked loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this horizontal area or column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Concepts described herein may be embodied as apparatus, method, system, or computer program product. Accordingly, one or more of such embodiments may take the form of an entirely hardware embodiment, an entirely software embodiment (including firmware, resident software, and micro-code, among others) or an embodiment combining software and hardware, and for clarity any and all of these embodiments may generally be referred to herein as a "circuit," "module," "system," or other suitable terms. Furthermore, such embodiments may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations in accordance with concepts described herein may be written in an object oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

Figure 2:
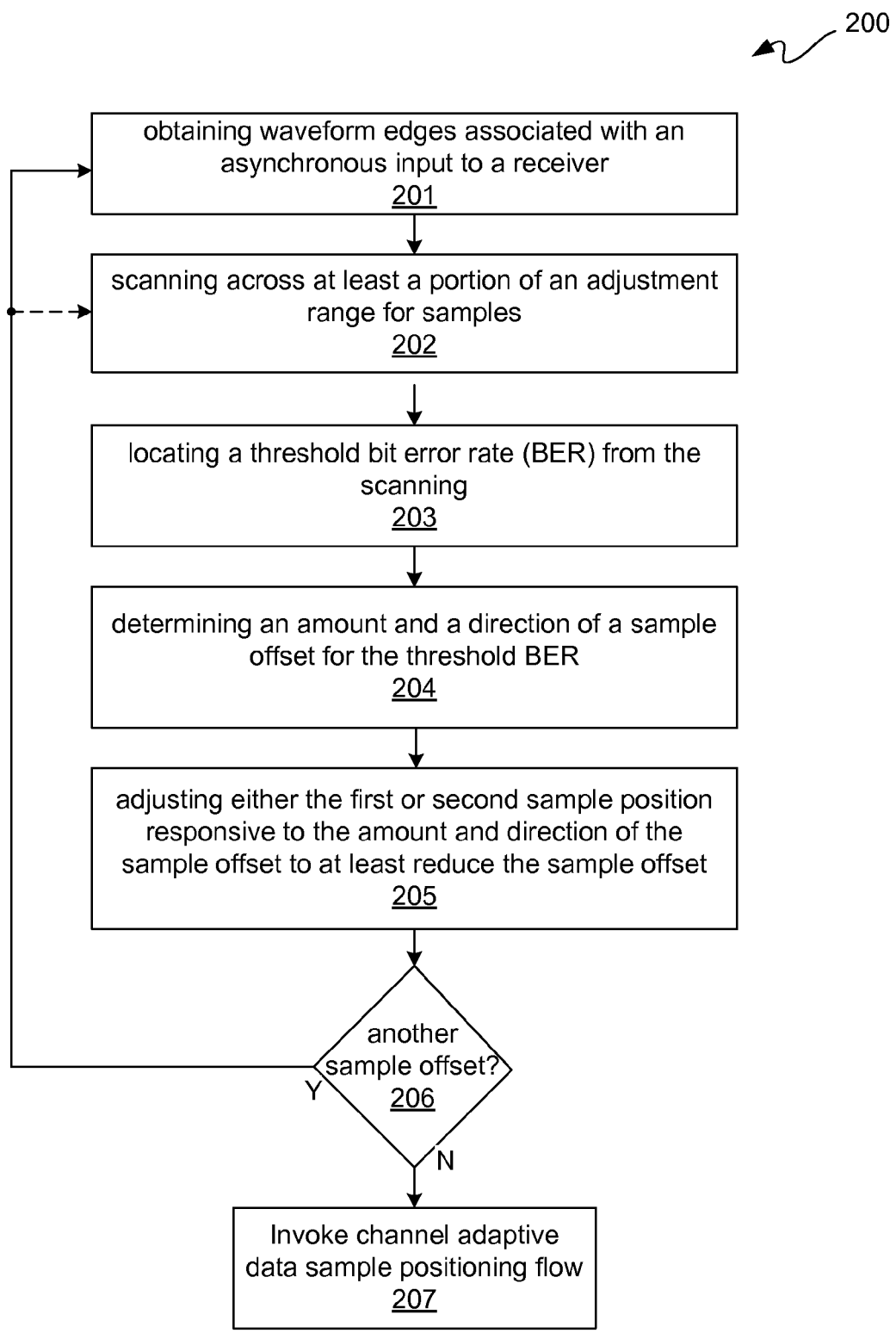
FIG. 2 is a flow diagram depicting an exemplary offset calibration flow.

FIG. 2 is a flow diagram depicting an exemplary offset calibration flow 200. At 201, waveform edges associated with an asynchronous input to a receiver are obtained. Such waveform edges may be densely distributed across an adjustment range. An adjustment range may be a unit interval ("UI") of an input bit associated with data samples provided to such receiver. Such a receiver ("RX") may have a phase interpolator, and this RX phase interpolator may have a resolution which is a fraction of a unit interval. For example, an RX phase interpolator may have a $\frac{1}{16}^{th}$, $\frac{1}{32}^{nd}$, $\frac{1}{64}^{th}$, or other smaller UI fractional resolution. Thus, waveform edges may be spaced-apart by a $\frac{1}{16}^{th}$ or smaller fraction of a UI for example to provide a dense distribution, as described below in additional detail.

Figure 3:
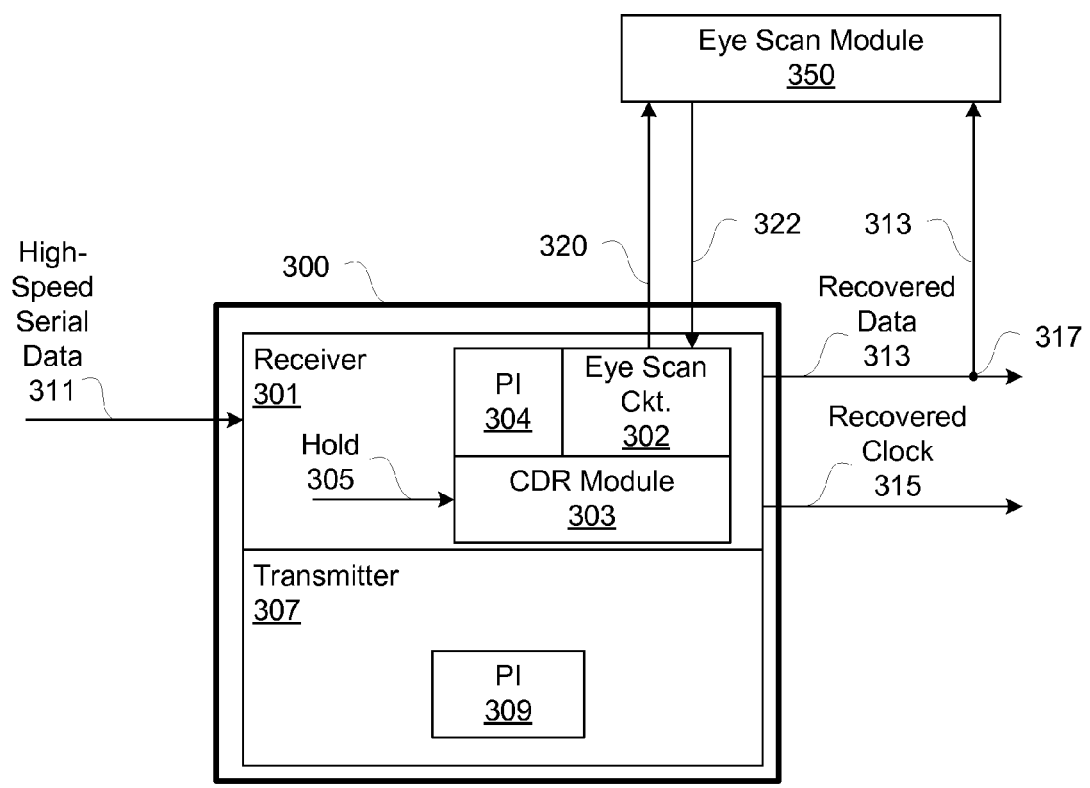
FIG. 3 is a block diagram depicting an exemplary transceiver.
Figure 4:
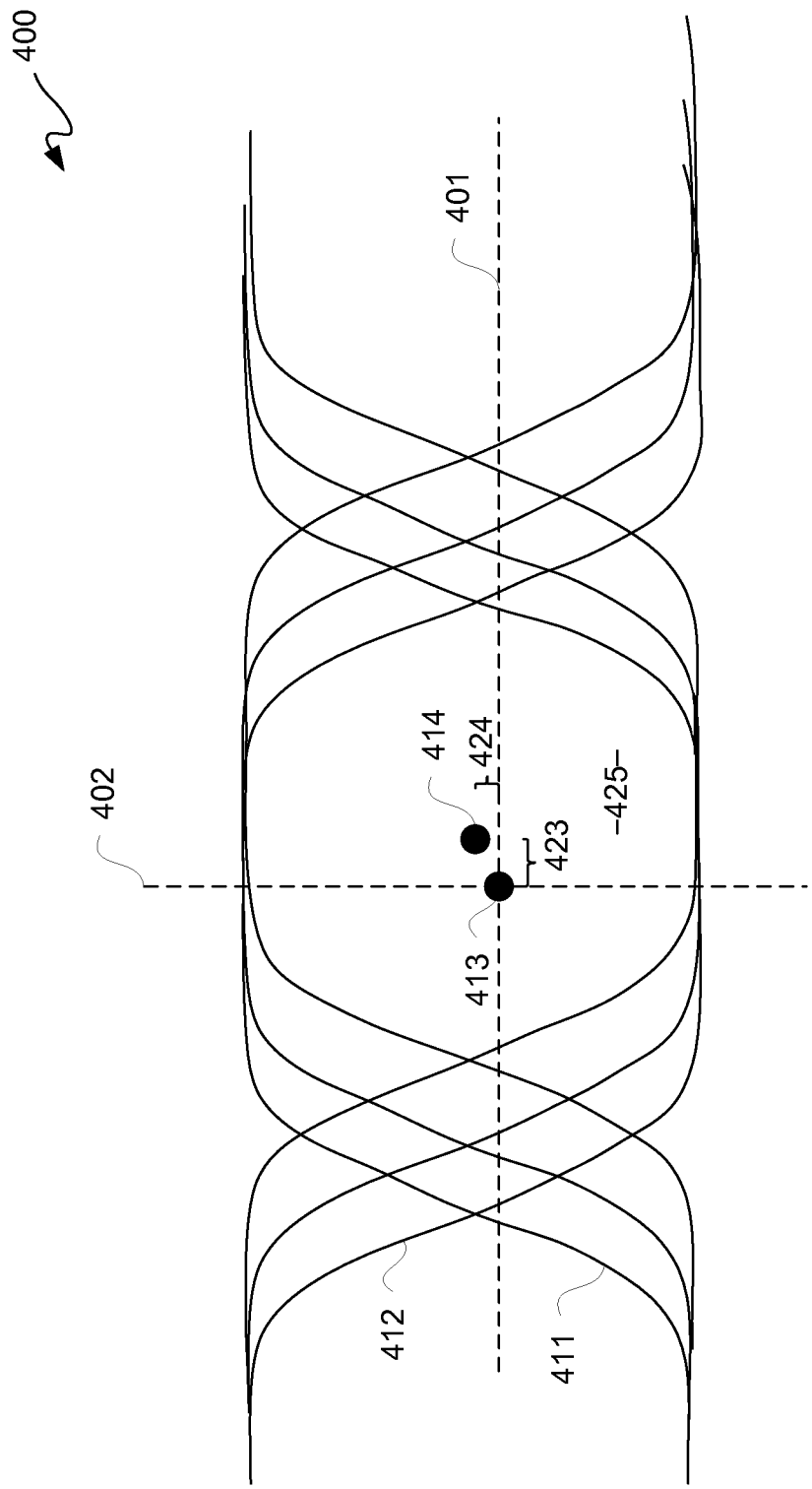
FIG. 4 is a signal diagram depicting a plurality of exemplary waveform signal pairs for a synchronous data input provided to a receiver of FIG. 3.

FIG. 3 is a block diagram depicting an exemplary transceiver 300. For purposes of clarity by way of example and not limitation, FIG. 4 is a signal diagram depicting a plurality of exemplary waveform signal pairs 400 for a synchronous data input 311 provided to receiver 301 of FIG. 3. With simultaneous reference to FIGS. 3 and 4, transceiver 300 is further described along with operations thereof.

Transceiver 300 includes a receiver 301 and a transmitter 307. Receiver 301 includes a phase interpolator ("PI") 304, a clock-data-recovery ("CDR") module 303, and an eye scan circuit 302. Eye scan circuit 302 may be configured to obtain data samples at a selected eye scan sample position until a set number of data samples is obtained or until stopped, to determine if an error has occurred, and to output an error count and a sample count. Eye scan circuit 302 may be configured to compare a data sample obtained at one position against another data sample obtained at another position to determine if an error has occurred for a sampling cycle. Transmitter ("TX") 307 includes a PI 309. An example of a transceiver 300 that may be implemented is described in detail in "7 Series FPGAs GTX/GTH Transceivers User Guide", UG476 (v1.9.1), dated Apr. 22, 2013 ("UG476"). More particularly, UG476 at pages 206-210 provides information on RX margin analysis and eye scan theory, as well as RX PMA and PCS architectures to support an eye scan. For purposes of clarity by way of example and not limitation, it shall be assumed that transceiver 300 is that of an FPGA, such as described in UG476; however, other receivers or transceivers may be implemented, and this transceiver with eye scan support is merely a convenient example.

Receiver 301 may be coupled to receive data input 311, which may be asynchronous or synchronous data and may be high-speed serial data. Receiver 301 may be configured to provide recovered data 313 and a recovered clock 315. Recovered data 313 may be tapped at node 317. CDR module 303 may be coupled to receive a hold control signal ("hold") 305. Such dense distribution of waveform edges obtained at 201 may be provided by asserting hold 305 so as to unlock CDR module 303 so as to prevent such CDR module 303 from locking or even attempting to lock, along with an asynchronous input provided as data input 311 to receiver 301. By asserting a hold signal for a CDR module 303 of receiver 301 to unlock such module or other clock recovery circuit, this may generally provide a repeated overlapping of waveforms, as described below in additional detail.

Eye scan circuit 302 may effectively be for measuring or otherwise obtaining data for an eye scan. Along those lines, eye scan circuit 302 may be configured to receive one or more eye scan control signals 322. Examples of such one or more eye scan control signals 322 may include a horizontal offset for an eye scan position, a vertical offset for an eye scan position, and a number of samples to obtain, such as for a selected bit error rate ("BER").

With renewed reference to FIG. 2 and continued reference to FIGS. 3 and 4, offset calibration flow 200 is further described. An asynchronous input may be provided at 201 either directly as data input 311, or by inducing a fractional difference in clock frequency between a local reference clock and a reference clock used to generate a synchronous data input 311 by using a TX PI 309 to induce such parts per million fractional differences ("PPM"), or another form of providing an asynchronous input.

At 202, a scan may be made across an adjustment range for samples at a first sample position of a first sample type, such as data samples at a data sample position for example, for each of a plurality of sample positions of a second sample type, such as eye scan sample positions for example, to obtain an error count for a sample count for each of the plurality of sample positions. Thus, for a number of samples or sample count, an error count may be determined. For example, if a data sample obtained at a data sample position does not equal a data sample obtained at an eye scan sample position, then this difference amounts to an error. If these pairs of data samples are taken for a number of sampling cycles, namely a sample count associated with a BER, then an associated error count for such number of sampling cycles at such two positions may be determined. A sum of instances where data samples are not equal over a number of samples taken for two sampling positions is a BER for such two sampling positions. This sampling may be performed by holding one sampling position fixed and sequentially moving another sampling position across such an adjustment range, where an error count for a same sample count may be taken at each such position across such range. Accordingly, this information may be used to identify a second sample position of such plurality of second sample positions across an adjustment range with a minimum BER for example among such second sample positions relative to a fixed first sample position. Effectively, a plurality of BERs, namely one BER for each second sampling position across an adjustment range relative to a fixed first position, may be produced from which a minimum BER may be found. This may be done dynamically by moving such second position to minimize BER without necessarily covering each possible value in an adjustment range. Along those lines, scanning across an adjustment range may involve scanning across the entire adjustment range or just a portion thereof.

Continuing the above example, such scanning across an adjustment range for data samples at a data sample position at each of a plurality of eye scan sample positions to obtain an error count for a sample count for each of such plurality of eye scan sample positions, allows for such error count to be output, and optionally a sample count associated with such error count. Thus, once a sample count is reached for a scan, another scan may be initiated for another sample position until such sample count is reached, and so on. This output of BER for each of such second positions relative to a first position may be eye scan data output 320 from eye scan circuit 302. Eye scan control signals 322 and eye scan data output 320 may be provided from and to eye scan hardware, software including firmware, or a combination thereof, generally indicated as eye scan module 350 in FIG. 3. Such control signals 322 may be used to set a scan count for each of a plurality of eye scan sampling positions relative to a fixed data sampling position. Furthermore, such control signals 322 may be used to increment an eye scan sampling position, which may be used to scan across at least a portion of a horizontal adjustment range, namely across at least a portion of a UI.

In another implementation, such scanning at 202 may be across an adjustment range for eye scan samples for each of a plurality of data sample positions to obtain an error count for a sample count for each of the plurality of data sample positions. Thus, for example, an eye scan sample position may be such first sample position, a data sample position may be such second sample position, such plurality of sample positions may be data sample positions, and a sample offset may be a data sample position-to-eye scan sample position offset.

However, for purposes of clarity, it shall be assumed that such scanning is for moving eye scan positions, and it shall further be assumed that such an adjustment range is a unit interval, and thus generally is associated with a horizontal time axis or phase axis. However, an adjustment range may be a voltage amplitude range for a signal, such as a differential high-speed serial signal for example, and thus generally may be associated with a vertical voltage axis. For example, an offset calibration may be performed with respect to a horizontal time axis or range and a vertical voltage axis or range together, such as for determining a location on an x- and y-grid. However, for purposes of clarity by way of example and not limitation, a horizontal offset, such as via eye scan control signals 322 for example, in either a positive or negative direction in time or phase, may be provided for an eye scan sampling position 413 with a fixed vertical position or offset at 0 for such positional changes.

In this example, there are 3 signal pairs of signals 411 and 412, where such pairs form an eye or data eye 425. In this example, eye 425 is "open." An eye scan may have a horizontal axis 401 associated with time or phase, and a vertical axis 402 associated with amplitude, such as signal voltage amplitude. In this example, an eye scan sampling position or point 413, namely a position where eye scan samples are taken, is at (0, 0) of axes 401 and 402. Such sampling position may, though need not be, at (0, 0).

In this example, a data sampling position or point 414 is horizontally spaced apart from eye scan sampling position 413 by a horizontal distance 423, such as a number of counts or ticks of a fraction of a UI, and is vertically spaced apart from eye scan sampling position 413 by a vertical distance 424, such as a voltage magnitude. An eye scan sampling position may or may not be centered to eye 425, which may vary from application-to-application depending on where margin, whether such as for time or voltage, is to be allocated. Thus, there may be a sample offset in a voltage difference in a vertical direction of an eye scan, and there may be another sample offset in a time or phase difference in a horizontal direction of an eye scan. Accordingly, an adjustment range may be a voltage amplitude range or a time or phase difference adjustment range, the latter of which may be represented with counts.

For purposes of clarity and not limitation, it shall be assumed that having a data sampling time centered to edges of an eye 425 is to be used. When eye scan and data sampling positions are not equal, namely co-located at a same point in time and in voltage, a scan error may result. With reference to an error in time or phase, positions 413 and 414 are not at the same horizontal-coordinate on axis 401, and with reference to an error in voltage, positions 413 and 414 are not at the same vertical-coordinate on axis 402.

Generally, two samplers, such as two clocked latches for example, may be used to sample, including subsampling, sampling, or oversampling, namely one for obtaining eye scan samples and another one for obtaining data samples. One of such samplers effectively may be fixed as a reference, and the other of such samplers may be moved relative to such fixed sampler in order to find coincidence, as described below in additional detail. For purposes of clarity and not limitation, the following description is in terms of moving an eye scan sampling position relative to a fixed data sampling position; however, in another example, an eye scan sampling position may be a fixed reference position and a data sampling position may be moved. Along those lines, a horizontal or vertical offset for an eye scan sampling position may be set or otherwise adjusted. Generally, as positions 413 and 414 are moved farther apart, error rate increases, as more edges of eye enveloping signal pairs 411 and 412 are more likely to be located between such positions. Conversely, as previously described, for positions 413 and 414 coincident, BER is minimized.

Thus, errors may result when positions 413 and 414 are not coincident. Again, for purposes of clarity and not limitation, horizontal error calibration is described below in additional detail, as vertical error calibration may likewise be understood from the following description. Accordingly, the following description is generally directed at calibrating out offset between a data sample time and a (0, 0) eye scan sample time. Of course, calibration of this sort may be limited to granularity of measurement of error in such sampling times. Thus, such plurality of eye scan sample positions may all be for an eye scan vertical position of zero.

Figure 5:
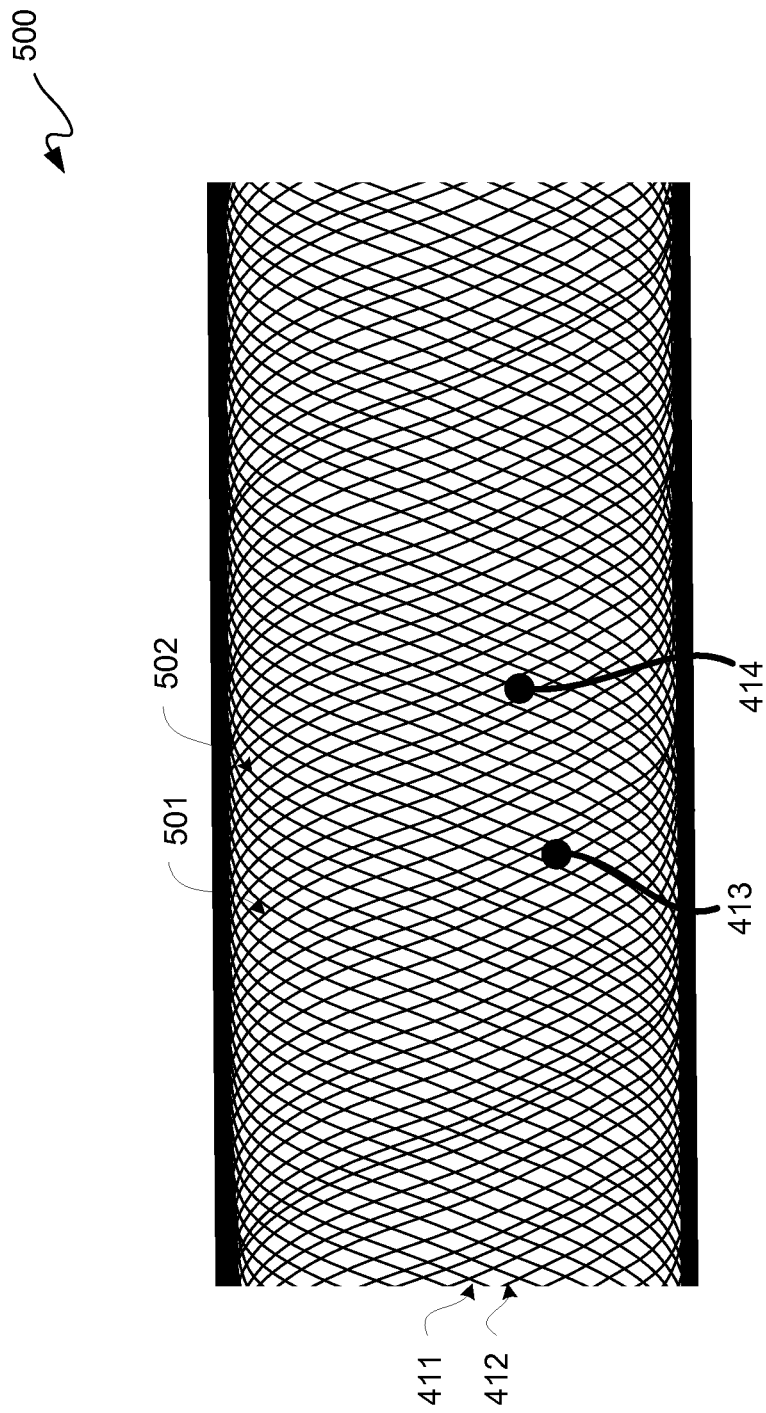
FIG. 5 is a signal diagram depicting a plurality of exemplary waveform signal pairs for an asynchronous data input provided to a receiver of FIG. 3.

Again, for purposes of clarity by way of example and not limitation, FIG. 5 is a signal diagram depicting a plurality of waveform signal pairs 500 for an asynchronous data input 311, such as previously described. In this example, there are a number of signal pairs of signals 411 and 412, where such pairs overlap one another sufficiently densely, such that eye 425 of FIG. 4 is "closed." Thus, each eye 425 may be substantially filled with a dense distribution of edges. In other words, eyes 425 overlap one another so as to effectively provide a "blurring" or overlapping effect for waveforms 500. For example, waveform edges may be spaced-apart by a $\frac{1}{16}^{th}$ or smaller fraction of the unit interval. This fraction may be associated with a resolution of a phase interpolator or other phase adjustment circuit of a receiver. Positions 413 and 414 in this example may have one or more edges, such as descending edges 501 and ascending edges 502 for example, of such waveform signal pairs 500 between them.

Returning to FIG. 2, at 203, a threshold bit error rate ("BER") is located from scans performed at 202. Effectively scans performed at 202 are to move an eye scan sampling position relative to a fixed data sampling position reference to determine whether there is a difference between each two sampling positions at each of such respective positions. For an eye scan displayed image, this may be thought of as having eye scan vertical line pixels set to zero. In other words, an "error rate" at this juncture refers to a determined difference, if any, of data samples obtained at a data sampling position and an eye scan sampling position.

At 203, locating a threshold BER, which may be a minimum BER, may be performed by invoking a search. Though a suboptimal threshold for a threshold BER may be used, for purposes of clarity by way of example and not limitation, it shall be assumed that such threshold BER is a minimum BER. Thus, such a search to find a minimum may be performed with by sequentially checking all positions ("brute force"), a gradient search, a simulated anneal, or other searching to find a minimum. It should be appreciated for synchronous data, namely when CDR module 303 is locked for producing a recovered clock signal 315, no errors may be detected. Thus, by having CDR module 303 unlocked, errors may be detected.

At 204, an amount and a direction of an eye scan sample-to-data sample offset for a minimum BER located at 203 may be determined. Assuming such minimum BER located is for eye scan and data sampling positions in a horizontal direction being coincident, a count difference between such reference data sampling point and such eye scan sampling point for such minimum BER located may be obtained. This is just a horizontal or count difference between these two sampling positions.

Figure 6:
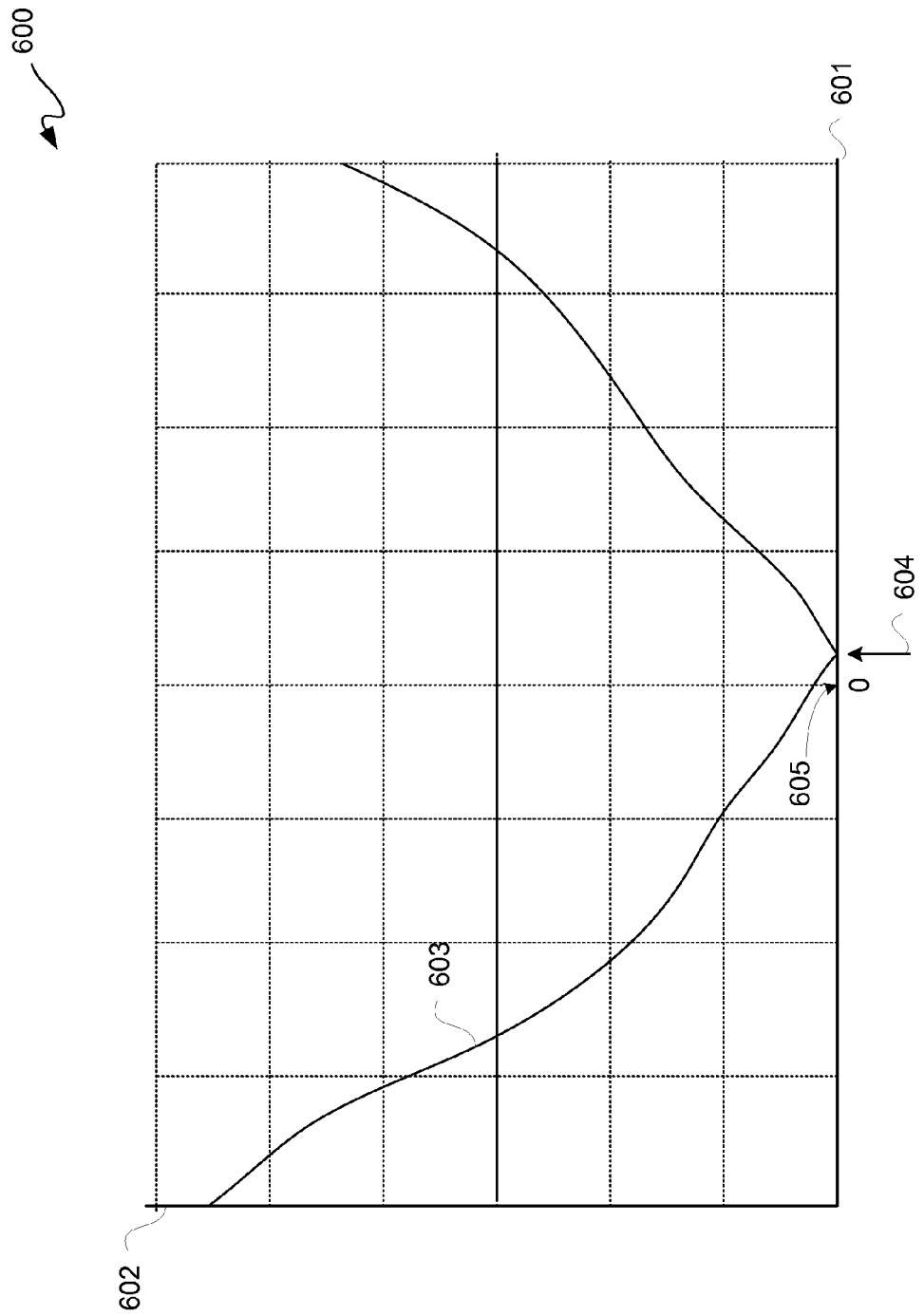
FIG. 6 is a graphical diagram depicting an exemplary eye scan-to-data sample horizontal offset plot.

Again, for purposes of clarity and not limitation, FIG. 6 is a graphical diagram depicting an exemplary eye scan-to-data sample horizontal offset plot 600. This plot is used to enhance understanding, as no such plot need be performed to determine a count difference between a reference sampling point and another sampling point as described above where a minimum BER is located.

Horizontal axis 601 in this example is from minus to plus 32, which means from $-\frac{32}{64}$ths of a UI to $+\frac{32}{64}$ths of such a UI, namely a PI with a 64 "count" resolution. For example, if data input 311 is provided at 10 gigahertz ("GHz"), then bit width of a bit (e.g., a signal length for differential or single-ended signals representing a single bit) is approximately 100 picoseconds ("ps"), and so such 100 ps may be broken up into 64 increments or counts (i.e., a count in this example is 100 ps divided by 64). In this example, for a 64 count resolution, each two counts are $\frac{1}{32}$ of an eye 425. In this or other examples, other count resolutions may be used. For example, here an RX PI has a minimum resolution of 64 counts; however, a coarser or finer resolution than a minimum resolution of a PI may be used. Furthermore, an RX PI need not be used, as other devices used to parse a UI may be used, including a DLL or variations of a PLL.

Accordingly, at discrete instances associated with 64 counts from count −32 to count +32 along horizontal axis 601, namely along eye scan count position axis, discrete data points 603 associated with error counts or BERs, where vertical axis 602 represents a BER or error count for each of a plurality of eye scan sample positions, which in this continued example are discrete eye scan sampling times. A number of sample counts for scanning for each of a plurality of sample positions may be for a BER target, such as for example an error for every $10^{12}$ (i.e., 1E12) bit samples or some other BER target. The ratio is number of differences between samples or error count divided by a total number of sampling cycles taken at two sampling positions or sample count, which may be for many sampling cycles. In this example, a target BER may be expressed as 1.E-12; however, another target BER may be used in other examples. In this example, a minimum BER is at location 604, which corresponds in this example to a horizontal count of +2 from a reference location 605. In this example, reference location 605 is at a center location, namely count zero; however, in other implementations, a center location need not be used. Of course, in other examples, a count difference may be plus or minus, and may be 2 or some other integer difference in horizontal offset. This count difference is an eye scan sample-to-data sample offset, or more particularly for this example an eye scan sample-to-data sample horizontal offset. Again, a vertical difference may also be found using the above-description, though for a positive or negative voltage offset.

Thus, because an eye may be asymmetrical, sampling margin on one side of such eye may be better than on an opposite side of such eye. However, by moving a sampling point closer to or to a center of an eye, then more signal margin may be provided. Such sampling may thus be more immune to jitter or other types of noise for example.

Returning to FIG. 2 with continued reference to FIG. 6, at 205, sampling position may be adjusted responsive to amount and direction of such eye scan sample-to-data sample offset to calibrate out such eye scan sample-to-data sample offset. To continue the above example, eye scan horizontal sample position may be adjusted. Continuing the above example of a sample offset of +2 in along a horizontal time axis, a horizontal offset may be set at −2. Of course, other counts may be used as offset may vary.

However, more generally, either a data sample position or an eye scan sample position may be adjusted for a horizontal offset or a vertical offset, as applicable. This adjustment at 205 may thus include adjusting a horizontal offset for an eye scan sample position to calibrate out or at least substantially reduce such eye scan sample position-to-data sample position offset. In another implementation, such sample offset may be a voltage difference in a vertical direction of an eye scan, and so a vertical offset may be adjusted to at least reduce such sample offset. Again, such sample offset determined may be in terms of a horizontal or vertical offset, such as in time or in amplitude, and thus such calibration to at least reduce such offset may involve adjusting either or both a horizontal offset or a vertical offset for a sample position, whether an eye scan or data sample position.

Figure 7:
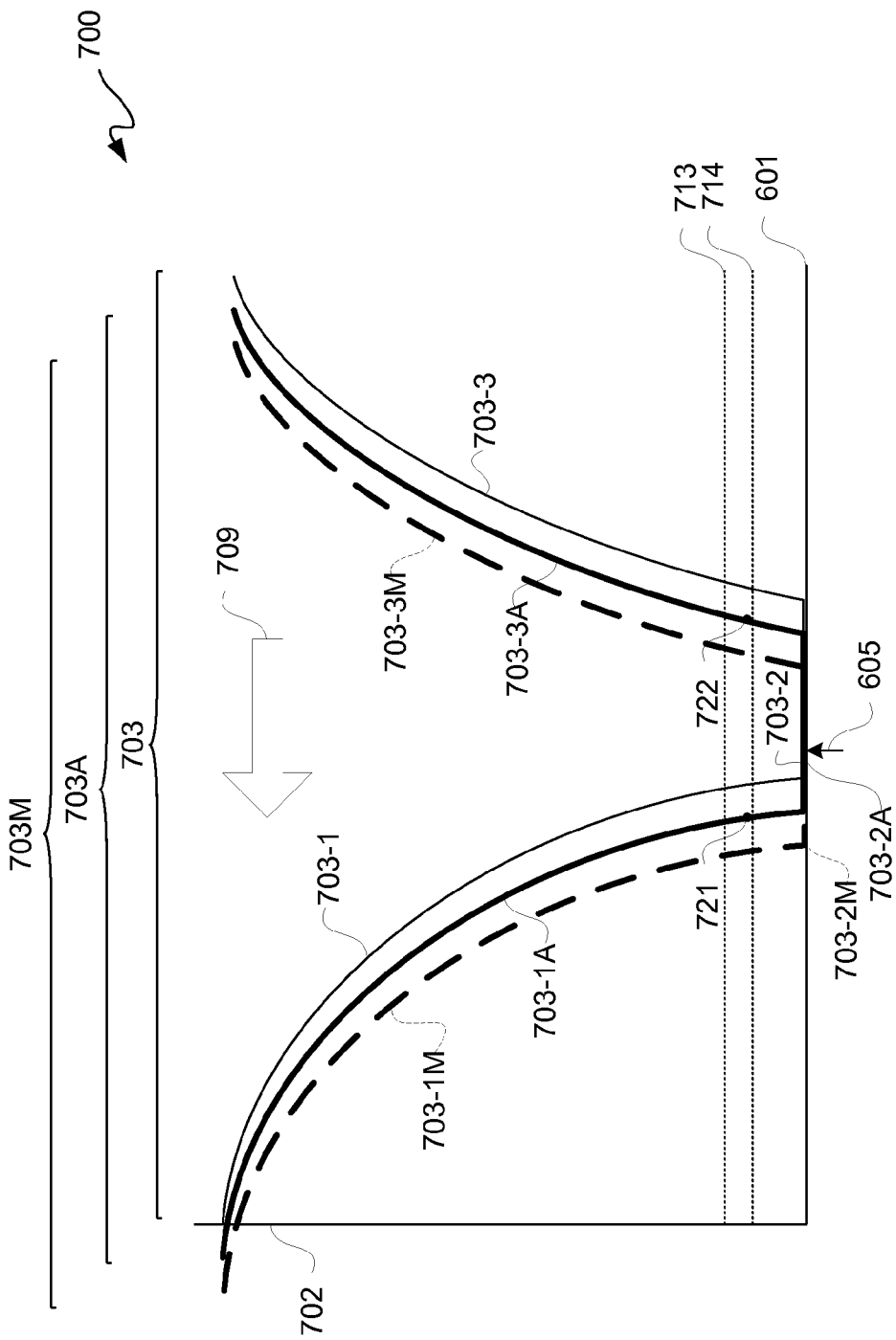
FIG. 7 is a graphical diagram depicting an exemplary "bathtub" plot for the example of FIG. 6 before and after an offset adjustment.

Again, for purposes of clarity and not limitation, FIG. 7 is a graphical diagram depicting an exemplary BER "bathtub" plot ("plot") 700 for the above example before and after adjustment at 205 of FIG. 2. This plot is used to enhance understanding, as no such plot need be performed to perform an offset adjustment.

Plot 700 is horizontal axis 601 for counts, as previously described, versus BER, or more particularly an error to sample counts ratio, vertical axis 702 plot. Plot 700 includes a bathtub curve 703 having a left curved portion or "left edge" 703-1, a central flat portion 703-2, and a right curved portion or "right edge" 703-3 prior to horizontal offset adjustment. Continuing the above example for purposes of clarity and not limitation, a horizontal offset adjustment of 2 counts in a negative count direction is made to bathtub curve 703, which shifts bathtub curve 703 to the left by 2 counts as generally indicated by adjusted bathtub curve 703A. This adjustment may be made by setting a register value in hardware or assigning a value to a variable in software, for example. Accordingly, left curved portion 703-1, central flat portion 703-2, and right curved portion 703-3 are all shifted two counts to the left as generally indicated by adjusted left curved portion 703-1A, adjusted central flat portion 703-2A, and adjusted right curved portion 703-3A. This shift in hardware or software may be implemented as a subtraction, whereas a shift to the right may be implemented as an addition. In this example, adjusted bathtub curve 703A, which is depicted with a thicker black line for purposes of clarity, may extend 2 counts to the left of vertical axis 702, and this portion of bathtub curve 703A may be ignored.

Additionally, there may a high BER threshold level and a low BER threshold level, as generally indicated by dotted lines 713 and 714, respectively. Central flat portion 703-2A is where there is a cut-off BER. In other words, left and right edges 703-1A and 703-3A actually may extend below central flat portion 703-2A and asymptotically approach one another. However, such low or small BERs may be outside of a useful range, so such cut-off is generally indicated as central flat portion 703-2A.

Accordingly, after a horizontal offset adjustment, all subsequent eye scan samples may be offset by such an amount of offset by having a registered or otherwise set value to shifted eye scan sample position. Again, a vertical offset may also be set.

Effectively an eye scan position of (0, 0) may be aligned with a data sample position. However, such eye scan position (0, 0) may not be symmetrically located in a data eye. So even with a calibrated eye, an adjusted bathtub curve 703A may be misaligned, namely not centered with respect to a zero count position 605 for example. This misalignment may likewise reduce margin in a receiver. Furthermore, where eye scan-to-data scan position may be relatively static, namely quasi-static, for a communications lane or channel, so that horizontal and vertical offsets do not need to be reset or at least not reset very often, bathtub curve 703A may move due to a clock used to transmit synchronous data slewing with respect to a clock used to recover such synchronous data on a communication channel. Accordingly, as described below in additional detail, edges 703-1A and 703-3A of bathtub curve 703A may be tracked during operation for adaptively changing to these or other changes in a communications channel.

Returning to FIG. 2, after any adjustment at 205, it may be determined whether another sample offset needs to be determined and adjusted for at 206. Such other offset may be a vertical offset for a communications channel just processed, or a horizontal offset for another communications channel. If at 206 it is determined that another offset is to be determined and adjusted, then flow 200 may be repeated for such other offset starting at 201, or optionally at 202 if there is no change in communications channel. If, however, at 206 it is determined that no other offset is to be determined and adjusted, then a channel adaptive data sample positioning flow may be invoked at 207.

Figure 8:
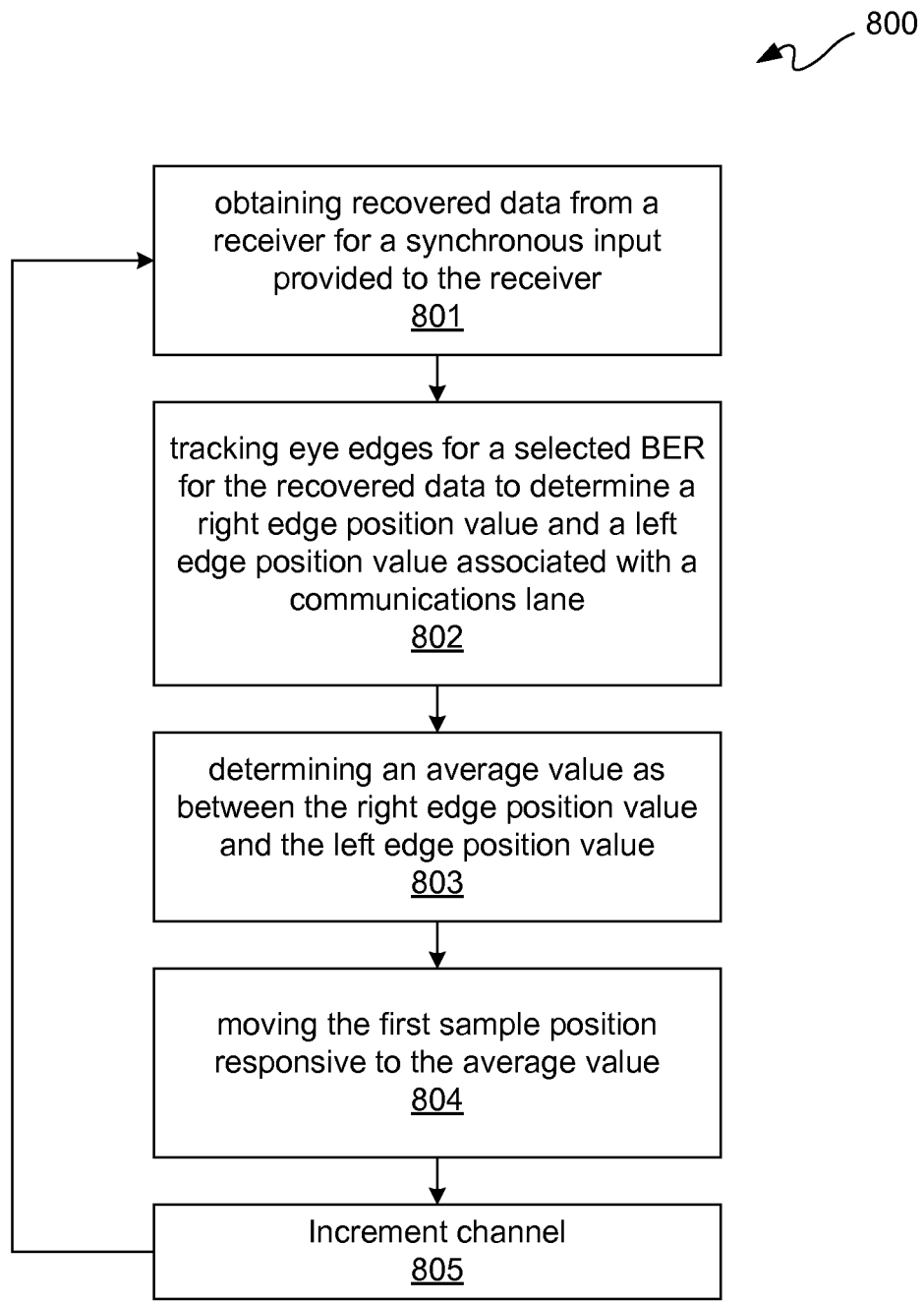
FIG. 8 is a flow diagram depicting an exemplary channel adaptive data sample positioning flow.

FIG. 8 is a flow diagram depicting an exemplary channel adaptive data sample positioning flow 800, which may be invoked at 207 of FIG. 2. With additional reference to FIGS. 3 and 7, flow 800 of FIG. 8 is further described.

At 801, recovered data 313 may be tapped at node 317, where recovered data 313 is output from receiver 300 for a synchronous input of data, such as high-speed serial data 311. In contrast to flow 200 of FIG. 2, flow 800 may be used in real time during actual operation of receiver 300. In other words, high-speed serial data 311 may be real customer data which is output as recovered data 313, and such recovered data 313 may be tapped to provide to eye scan module 350. Thus, non-destructive tracking of left edge 703-1A and right edge 703-3A of bathtub curve 703A of recovered data 313 may be performed.

At 802, eye edges, such as left edge 703-1A and right edge 703-3A, for a selected BER, within a selected BER range inclusive, for recovered data 313 may be tracked to determine a right edge position value and a left edge position value associated with a communications lane. For example, data of recovered data 313 at a left edge 703-1A position 721 and at a right edge 703-3A position 722 for a BER between high BER threshold level 713 and low BER threshold level 714 may be tracked. Selection of a BER for tracking may be a default predetermined value responsive to a communications standard or protocol, or optionally may be set by a user. Furthermore, such tracking at 802 may include storing running data values for each of such edges. Furthermore, some initial samples of data values may be ignored until a steady-state is reached. This is because it may take some time until measurements for a selected BER may settle to such BER. Furthermore, there may be some "hunting" to keep at a selected BER.

At 803, an average value as between a right edge position value and a left edge position value obtained from tracking may be determined. For example, suppose a left edge position value was 9 and a right edge position value was −5 for each at a BER of 1.E-12 continuing the above example, then an average of such values would be 2 (i.e., {9+(−5)}/2).

At 804, adjusted bathtub curve 703A may be moved responsive to an average value determined at 803. In this example, a moved adjusted bathtub curve 703M, as indicated with a dashed line for clarity, is moved 2 counts to the left to generally center, subject to granularity and other limitations, to a zero count position 605. As generally indicated, moved left edge 703-1M and moved right edge 703-3M, as well as moved central flat portion 703-2M, are moved over two counts to the left. Effectively, this moves a data sample position by such average value determined at 803. In this example, a positive average value is moved to the left, and a negative average value is moved to the right.

Timing of movement, while it may take place with real data does not adjust for each bit of data at a time. For example, suppose there is a data rate of 1E10 bits per second for synchronous high-speed serial data input 311 and a BER of 1E-12 is selected, then 100 seconds may lapse to get measured or tracked values from which to determine an average; and if each edge is sequentially tracked, rather than tracked in parallel, then 200 seconds may lapse to get both values in order to determine an average.

Furthermore, as time permits, such right and left edge values, or an average thereof, for a communications channel may be stored for determining over more than one measurement cycle any pattern of movement or an average value of average values or whether an accumulated shift in counts is sufficiently significant to determine whether to reposition a previously moved bathtub curve 703M. So, a transmitter may send data over a channel to a receiver, and such transmitter or communications may shift a data eye of such data transmitted. Moreover, a non-centered data eye may be caused by asymmetrical jitter distributions. As a receiver may not have control over a transmitter to correct for such distortion, a receiver may be configured to shift a data sampling position by moving a bathtub curve to adjust for a misaligned data eye to increase signal margin for recovering data for a communications channel.

At 805, a communications channel may be incremented, and flow 800 may proceed as a loop starting again at 801. Thus, a series of communications channels may adaptively have their receiver margin increased.

Figure 9:
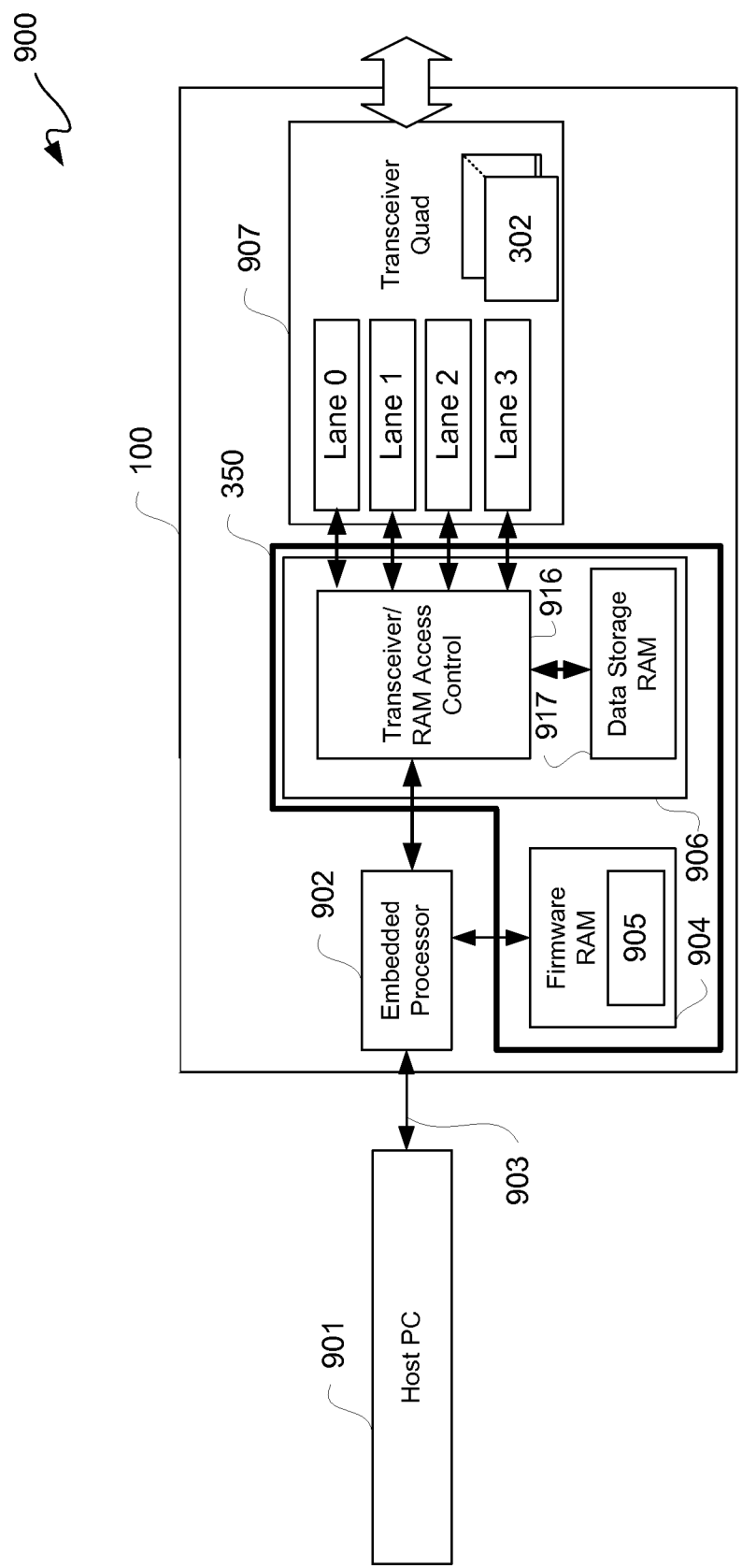
FIG. 9 is a block diagram depicting an exemplary receiver-side communications system.

FIG. 9 is a block diagram depicting an exemplary receiver-side communications system 900. A host personal computer ("PC") 901 may be coupled to an FPGA 100. FPGA 100 may have an embedded processor 902, an eye scan module 350, and a four channel transceiver ("transceiver quad") 907. Eye scan module 350 may include firmware RAM 904 having stored therein eye scan code 905, and state machines and memory 906.

Transceiver quad 907 may include eye scan circuit 302, as previously described herein. However, it should be understood that such eye scan circuit 302 may be positioned so it does not interfere with the flow of data, namely throughput, of transceiver quad 907. Furthermore, there may be a separate eye scan circuit 302 for each transceiver, or transceivers may share an eye scan circuit 302.

State machines and memory 906 may include transceiver/RAM access control state machines 916 respectively coupled to communication lanes 0 through 3 of transceiver quad 907 and coupled to embedded processor 902. State machines and memory 906 may include data storage RAM 917, which is coupled to transceiver/RAM access control state machines 916. Transceiver/RAM access control state machines 916 may be instantiated in programmable resources of FPGA 100.

Firmware or other program RAM 904, which is coupled to embedded processor 902, may have stored therein eye scan code 905 for execution by embedded processor 902. Code 905 may be for execution of at least one of flows 200 or 800. Embedded processor 902 may be coupled to host PC 901 via an interface 903, such as JTAG or other bus. Host PC 901 may be for displaying a data eye or other diagnostics. However, some or all of code 905 may be ported to host PC 901, but this would be for a slower operation. Otherwise, host PC 901 may be programmed generally to provide maintenance and diagnostics for eye scan operation. For example, if a data eye is slowly drifting, embedded processor 902 may send an alarm to host PC 901. Thus, moving at 804 may be for adaptively positioning a data position for recovered data as associated with a communications channel.

Figure 10:
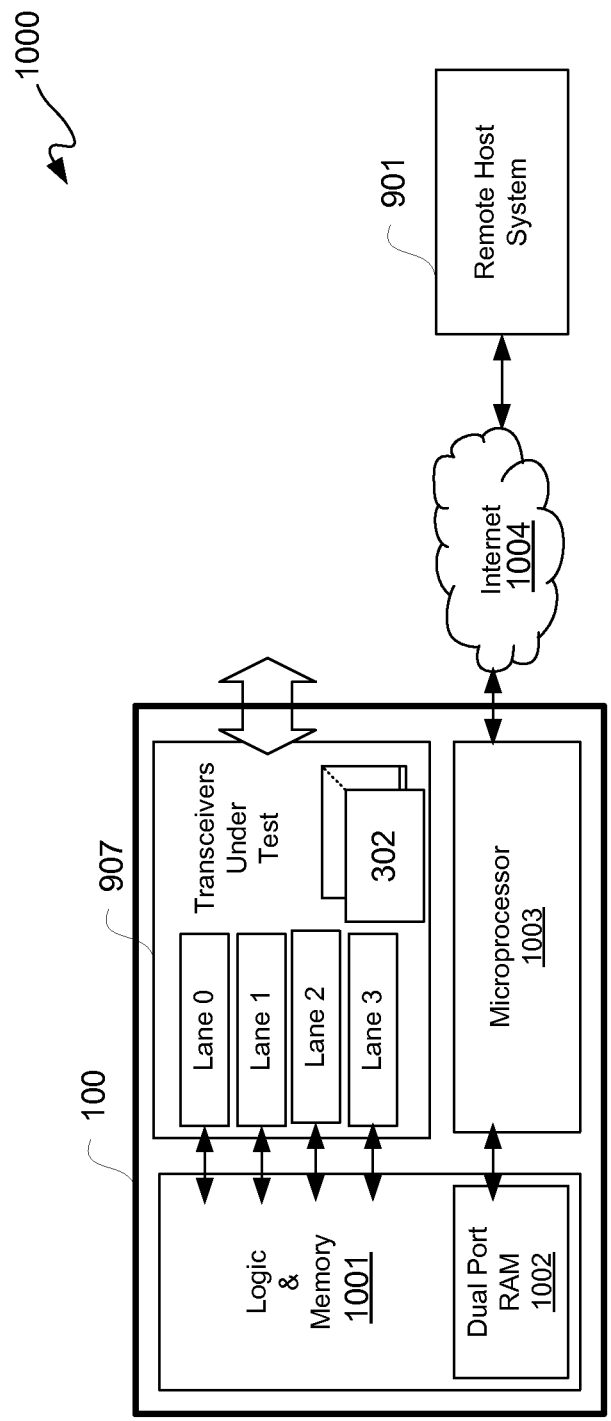
FIG. 10 is a block diagram depicting another exemplary receiver-side communications system.

FIG. 10 is a block diagram depicting an exemplary receiver-side communications system 1000. A remote host PC 901 may be coupled to an FPGA 100 via the Internet 1004. FPGA 100 may have an embedded microprocessor 1003, eye scan module logic and memory 1001, and a four channel transceiver 907. Transceiver quad 907 may include eye scan circuit 302, as previously described herein. Firmware RAM 904 of FIG. 9 may be coupled to embedded microprocessor 1003 though not shown in this figure for purposes of clarity.

Logic and memory 1001 may be a hard macro block, rather than instantiated logic as state machines and memory 906. Logic of logic and memory 1001 may respectively be coupled to communication lanes 0 through 3 of transceiver quad 907 and coupled to microprocessor 1003. Logic and memory 1001 may include data storage memory, which may be dual ported RAM 1002 coupled to microprocessor 1003.

This configuration allows for remote diagnosis. For example, if a deployed system exhibits unexpectedly high error rates, performance of data on a received serial link may be diagnosed by performing a remote scan. Remote host PC 901 may prompt an embedded processor, such as a microprocessor 1003, to initiate a scan and return results through Internet 1004 to such host system.

Figure 11:
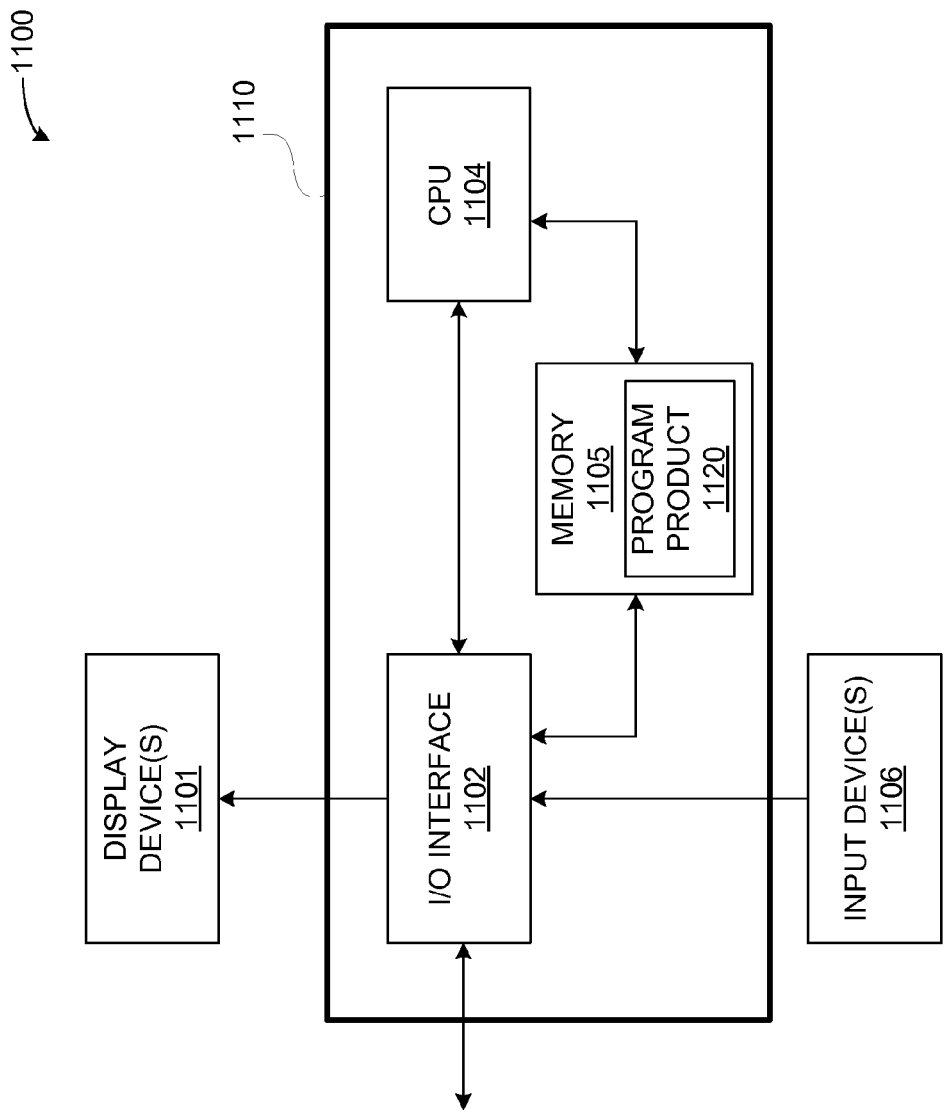
FIG. 11 is a block diagram depicting an exemplary computer system.

FIG. 11 is a block diagram depicting an exemplary computer system 1100. Computer system 1100 may include a programmed computer 1110 coupled to one or more display devices 1101, such as Cathode Ray Tube ("CRT") displays, plasma displays, Liquid Crystal Displays ("LCD"), projectors and to one or more input devices 1106, such as a keyboard and a cursor pointing device. Other known configurations of a computer system may be used. Computer system 1100 by itself or networked with one or more other computer systems 1100 may provide an information handling system.

Programmed computer 1110 may be programmed with a known operating system, which may be Mac OS, Java Virtual Machine, Real-Time OS Linux, Solaris, iOS, Android Linux-based OS, Unix, or a Windows operating system, among other known platforms. Programmed computer 1110 includes a central processing unit (CPU) 1104, memory 1105, and an input/output ("I/O") interface 1102. CPU 1104 may be a type of microprocessor known in the art, such as available from IBM, Intel, ARM, or Advanced Micro Devices for example. Support circuits (not shown) may include cache, power supplies, clock circuits, data registers, and the like. Memory 1105 may be directly coupled to CPU 1104 or coupled through I/O interface 1102. At least a portion of an operating system may be disposed in memory 1105. Memory 1105 may include one or more of the following: flash memory, random access memory including dynamic random access memory, read only memory, magneto-resistive read/write memory, optical read/write memory, cache memory, magnetic read/write memory, and the like, as well as other non-transitory signal-bearing media as described below.

I/O interface 1102 may include chip set chips, graphics processors, and/or daughter cards, among other known circuits. An example of a daughter card may include a network interface card ("NIC"), a display interface card, a modem card, and a Universal Serial Bus ("USB") interface card, among other known circuits. Thus, I/O interface 1102 may be coupled to a conventional keyboard, network, mouse, display, printer, and interface circuitry adapted to receive and transmit data, such as data files and the like. Programmed computer 1110 may be coupled to a number of client computers, server computers, or any combination thereof via a conventional network infrastructure, such as a company's Intranet and/or the Internet, for example, allowing distributed use for interface generation.

Memory 1105 may store all or portions of one or more programs or data to implement processes in accordance with one or more embodiments hereof to provide program product 1120. Thus, for example, programmed computer 1110 may be programmed with either or both of flows 200 and 800 in program product 1120, to convert a general-purpose computer to a special-purpose programmed computer 1110. For example, a general-purpose computer may be programmed to be a logic analyzer, where either or both of flows 200 and 800 are eye scan modules thereof. Additionally, those skilled in the art will appreciate that one or more embodiments hereof may be implemented in hardware, software, or a combination of hardware and software. Such implementations may include a number of processors or processor cores independently executing various programs and dedicated hardware or programmable hardware.

One or more program(s) of program product 1120, as well as documents thereof, may define functions of embodiments hereof and can be contained on a variety of non-transitory signal-bearing media, such as computer-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive (internal hard drive or external thumb drive/memory stick) or hard-disk drive or read/writable CD or read/writable DVD). The above embodiments specifically include information downloaded from the Internet and other networks. Such non-transitory signal-bearing media, when carrying computer-readable instructions that direct functions hereof, represent embodiments hereof.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method, comprising:
providing waveform edges associated with an asynchronous input to a receiver;
wherein the waveform edges are densely distributed across an adjustment range;
scanning at least a portion of the adjustment range for samples from the dense distribution of waveform edges at a first sample position of a first type for each of a plurality of sample positions of a second type different from the first type to obtain an error count for a sample count for each of the plurality of sample positions across at least the portion of the adjustment range;
wherein the adjustment range is a unit interval;
wherein the waveform edges are spaced-apart by a ¹⁄₁₆th or smaller fraction of the unit interval to provide the dense distribution thereof;
wherein the first sample position is fixed;
wherein a second sample position from the plurality of sample positions is moved across at least the portion of the adjustment range;
wherein the scanning includes performing a plurality of sampling cycles for the sample count at each of the plurality of sample positions;
locating a threshold bit error rate ("BER") from the scanning;
determining an amount and a direction of a sample offset at the threshold BER from a reference location; and
adjusting either the first sample position or the second sample position responsive to the amount and the direction of the sample offset to at least reduce the sample offset.

2. The method according to claim 1, wherein the adjustment range is the unit interval of an input bit.

3. The method according to claim 1, wherein the adjustment range is in terms of time or phase.

4. The method according to claim 1, wherein the fraction is associated with a resolution of a phase interpolator of the receiver.

5. The method according to claim 1, wherein:
the first sample position of the first type is a data sample position;
the second sample position of the second type is an eye scan sample position;
the plurality of sample positions are eye scan sample positions; and
the sample offset is an eye scan sample position-to-data sample position offset.

6. The method according to claim 5, wherein the adjusting includes adjusting a horizontal offset for the eye scan sample position to calibrate out the eye scan sample position-to-data sample position offset.

7. The method according to claim 5, wherein the locating comprises performing a search to find a minimum BER from a plurality of BERs for the plurality of sampling cycles performed at each of the plurality of sample positions.

8. The method according to claim 5, wherein the plurality of sample positions are all for an eye scan vertical position of zero.

9. The method according to claim 5, wherein the sample count for the scanning for each of the plurality of sample positions is for a BER target.

10. The method according to claim 5, further comprising asserting a hold signal for a clock data recovery ("CDR") module of the receiver to unlock the CDR module.

11. The method according to claim 1, wherein:
the first position of the first type is an eye scan sample position;
the second position of the second type is a data sample position;
the plurality of sample positions are data sample positions; and
the sample offset is a data sample position-to-eye scan sample position offset.

12. The method according to claim 1, wherein the sample offset is a voltage difference in a vertical direction of an eye scan.

13. The method according to claim 1, wherein the adjustment range is a voltage amplitude range.

14. The method according to claim 1, further comprising:
obtaining recovered data from the receiver for a synchronous input provided to the receiver;
tracking eye edges for a selected BER for the recovered data to determine a right edge position value and a left edge position value associated with a communications lane;
determining an average value as between the right edge position value and the left edge position value; and
moving the first sample position responsive to the average value.

15. An apparatus, comprising:
a receiver having a clock data recovery module to provide a dense distribution of waveform edges for an asynchronous input to the receiver;
wherein the waveform edges are densely distributed across an adjustment range;
wherein the adjustment range is a unit interval;
wherein the waveform edges are spaced-apart by a ¹⁄₁₆th or smaller fraction of the unit interval to provide the dense distribution thereof;

wherein the receiver includes an eye scan circuit to obtain samples from the dense distribution of waveform edges at a first sample position and a second sample position and to provide an error count for a sample count for the samples; and an eye scan module coupled to the receiver and configured to:
    scan at least a portion of the adjustment range for the samples at the first sample position of a first type for each of a plurality of sample positions of a second type different from the first type to obtain an error count for a sample count for each of the plurality of sample positions;
    wherein the first sample position is fixed;
    wherein the eye scan circuit is coupled to the eye scan module to increment the second sample position from the plurality of sample positions for movement across at least the portion of the adjustment range;
    wherein the eye scan circuit is coupled to the eye scan module to take a plurality of samples for the sample count at each of the plurality of sample positions;
    locate a threshold bit error rate ("BER") from the scan;
    determine an amount and a direction of a sample offset at the threshold BER from a reference location; and
    adjust either the first sample position or the second sample position responsive to the amount and the direction of the sample offset to at least reduce the sample offset.

16. The apparatus according to claim 15, wherein:
the first sample position of the first type is a data sample position;
the second sample position of the second type is an eye scan sample position;
the plurality of sample positions are eye scan sample positions; and
the sample offset is an eye scan sample position-to-data sample position offset.

17. The apparatus according to claim 15, wherein:
the first position of the first type is an eye scan sample position;
the second position of the second type is a data sample position;
the plurality of sample positions are data sample positions; and
the sample offset is a data sample position-to-eye scan sample position offset.

18. The apparatus according to claim 15, wherein:
the eye scan module is coupled to the receiver to obtain recovered data therefrom for a synchronous input; and
the eye scan module is configured to:
    track eye edges for a selected BER for the recovered data and to determine a right edge position value and a left edge position value;
    determine an average value as between the right edge position value and the left edge position value; and
    move the first sample position responsive to the average value.

* * * * *